April 6, 1937.     J. VANA     2,076,257

BATTERY CABLE TERMINAL CLAMP

Filed March 23, 1936

Inventor
James Vana
By [signature]
Attorneys

Patented Apr. 6, 1937

2,076,257

UNITED STATES PATENT OFFICE 2,076,257

BATTERY CABLE TERMINAL CLAMP

James Vana, Milwaukee, Wis.

Application March 23, 1936, Serial No. 70,347

2 Claims. (Cl. 173—259)

This invention appertains to storage batteries, and more particularly to novel means for connecting the terminal cable thereto.

As is well known, much difficulty is experienced in removing terminal clamps from storage battery posts, due to the fact that clamps soon become badly corroded. Various attempts have been made to construct the clamps to facilitate their removal, but all these devices with which I am familiar fail to serve their desired function. The use of special tools likewise fails to solve the problem, as the likelihood of injuring the post or battery is always present.

It is, therefore, one of the primary objects of my invention to provide a cap for engaging over the battery post, with a holding nut therefor to serve the dual function of clamping the cap in place to insure a good contact when the nut is turned in one direction, and as a lifting jack for the cap when the nut is turned in the opposite direction.

Another salient object of my invention is to provide a storage battery terminal clamp embodying a cap for housing the battery post, with means for detachably connecting the terminal cable externally of the cap, whereby the cable can be quickly removed without necessitating the removal of the cap from the post, the cap acting to prevent corrosion from reaching the cable.

A further important object of my invention is the provision of a terminal clamp including a cap having a threaded body split at spaced points longitudinally to provide gripping fingers, with a nut threaded on the body portion for contracting said fingers about the battery post, and for engaging the top of the battery, and for lifting the cap off the post when the nut is turned in one direction.

A still further object of my invention is to provide an improved storage battery terminal clamp of the above character, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawing, in which drawing:

Figure 1:
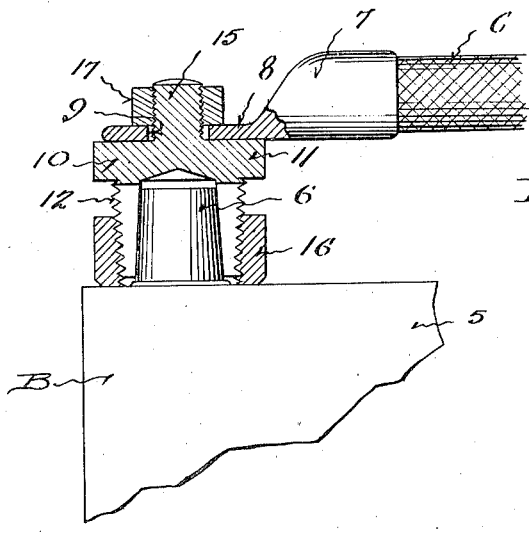
Figure 1 is a vertical section through my improved terminal clamp, showing the same applied to a post of a storage battery.
Figure 2:
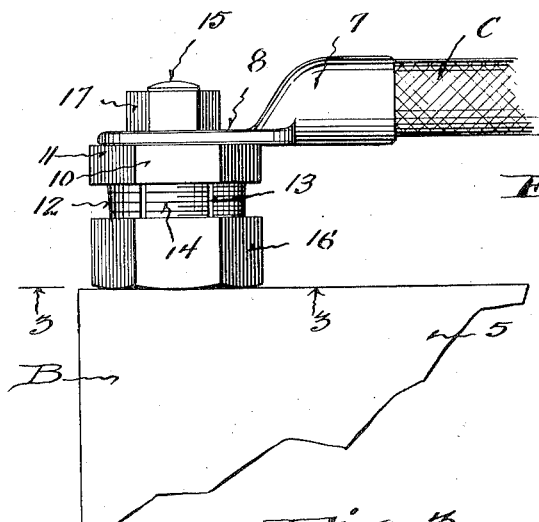
Figure 2 is a side elevation of the improved clamp, showing the same applied to a battery.
Figure 3:
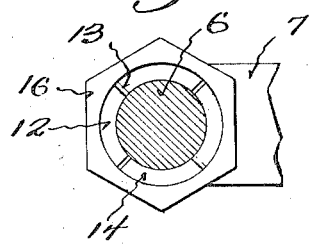
Figure 3 is a detail section taken substantially on the line 3—3 of Figure 2, looking in the direction of the arrows.

Referring to the drawing in detail, wherein similar reference characters designate corresponding parts throughout the several views, the letter B generally indicates a storage battery, and C a cable leading from the battery. The battery B forms no part of the present invention and can be considered as of any preferred character or make, and, as illustrated, includes the body portion 5 and terminal post 6.

The cable C is also of any desired construction and has securely connected to its end a terminal 7. This terminal 7 includes a flat disc 8 provided with a center opening 9.

The improved clamp includes a cap 10 having a nut-shaped solid upper portion 11 and a depending skirt 12. This skirt is externally threaded and is provided at spaced points with longitudinally extending slits 13 to form resilient finger portions 14. An upwardly extending centrally disposed threaded stud 15 is formed on the upper end of the cap, for a purpose which will be later set forth. The skirt 12 can be slightly tapered toward its lower end, and the inner face of the skirt is shaped to conform to the configuration of the battery post 6.

A nut 16 is threaded on the skirt, and the cap, when the nut 16 is partially threaded off the same, is adapted to be placed upon the post 6. By pushing down on the cap and tightening up the nut, the fingers 14 can be brought into gripping contact with the post 6, so as to prevent accidental removal of the cap and to insure the forming of a good contact between the post and the cap.

When the nut 16 is threaded off the cap, the same engages the top of the battery and serves as a jack for forcing the cap up and off the post. This will effectively loosen the cap from the post and permit easy removal thereof, irrespective of whether or not the cap corrodes on the post.

By providing the stud 15, the terminal 7 can be placed on top the cap with the stud extending through the opening 9 in the terminal. The terminal can then be firmly connected with the cap by means of a nut 17 threaded on the stud.

Obviously, the cap can be left in place on the post, and the cable can be removed from the battery by merely removing the nut 17. The cap functions as means for preventing corrosion from reaching the post 15, and hence the quick removal of the cable is always assured.

From the foregoing description it can be seen that I have provided an exceptionally simple and durable means for connecting a cable to a battery post, which will permit the quick removal of the cable from the battery without injury to the battery in any way.

Changes in details may be made without departing from the spirit or the scope of my invention, but what I claim as new is:

1. The combination with a storage battery including a post and cable terminal for connection therewith, of means for detachably securing the cable terminal to the post including a cap having a depending skirt for receiving the post, the skirt having its outer face tapering toward its lower end, and externally threaded to its extreme lower edge said skirt being provided with longitudinally extending slits, a nut threaded on said skirt for contracting the skirt about the post and for engaging the upper face of the battery and for lifting the cap off the post when the same is turned off the skirt, and means for connecting the cable terminal to the outer face of the cap.

2. The combination with a storage battery including a post and cable terminal for connection therewith, of means for detachably securing the cable terminal to the post including a cap having a depending skirt for receiving the post, the skirt having its outer face tapering toward its lower end and externally threaded to its extreme lower edge, said skirt being provided with longitudinally extending slits, a nut threaded on said skirt for contracting the skirt about the post when the same is threaded up on the skirt and for engaging the upper face of the battery and for lifting the cap off the post when the same is turned off the skirt, and means for connecting the cable terminal to the outer face of the cap, said means including a threaded stud on the cap and a nut threaded on the stud.

JAMES VANA.